(12) United States Patent
Heimann et al.

(10) Patent No.: US 6,255,963 B1
(45) Date of Patent: Jul. 3, 2001

(54) METHOD FOR TRANSMITTING TRAFFIC INFORMATION AND DEVICES FOR IMPLEMENTING SAID METHOD

(75) Inventors: Josef Heimann, Düsseldorf; Werner Schulz, Meerbusch; Stefan Vieweg, Willich, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/355,818
(22) PCT Filed: Feb. 4, 1998
(86) PCT No.: PCT/DE98/00396
 § 371 Date: Aug. 4, 1999
 § 102(e) Date: Aug. 4, 1999
(87) PCT Pub. No.: WO98/34210
 PCT Pub. Date: Aug. 6, 1998

(30) Foreign Application Priority Data
 Feb. 4, 1997 (DE) .............................. 197 06 046
(51) Int. Cl.[7] ................................................ G08G 1/09
(52) U.S. Cl. ........................ 340/905; 340/539; 701/117
(58) Field of Search .................................. 340/965, 539; 701/117

(56) References Cited
U.S. PATENT DOCUMENTS 5,729,214 * 3/1998 Moore ................................ 340/905
6,097,313 * 8/2000 Takahashi et al. ................. 340/905

* cited by examiner

*Primary Examiner*—Daryl Pope
(74) *Attorney, Agent, or Firm*—Cohen, Pontani, Lieberman & Pavane (57) ABSTRACT

The redundancy of transmitted traffic information or of traffic information which is to be transmitted is optimized by a method for transmitting traffic information from a traffic information center to at least one terminal device in a vehicle via a publicly receivable (e.g., DAB, RDS-TMC) communications channel or via a private communications channel (e.g., mobile radio), wherein a first reference zone is defined at or around the known or presumed stopping place of at least one vehicle to which information is to be conveyed at a first time point. At least a second reference zone is defined at or around at least one presumed stopping place of the vehicle at a second time point lying in the future in relation to the first time point. Traffic information generated for a reference zone and for a respective future time point with forecasting and/or traffic information determined for the current time point and for the respective current reference zone are/is compiled. Data representing traffic information with the time point to which it relates and/or the reference zone to which it relates are transmitted.

36 Claims, 8 Drawing Sheets

METHOD FOR TRANSMITTING TRAFFIC INFORMATION AND DEVICES FOR IMPLEMENTING SAID METHOD

BACKGROUND OF THE INVENTION

1. Field of the Invention

The invention is directed to a method for transmitting traffic information and to devices for carrying out the method.

2. Discussion of the Prior Art

Basically, traffic information representing the current or future state of a traffic network or part of a traffic network can be transmitted from a traffic information center to at least one terminal device of a traffic information customer via radio, mobile radio, etc. Traffic information is obtained for this purpose from different sources such as stationary detectors, FCDs (vehicles floating in traffic), traffic bulletins, etc. and is conveyed to terminal devices from a traffic information center. However, the amount of traffic information available to a traffic information center can be very large. Therefore, the traffic information centers, in the form of local radio transmitters, compile only current traffic information concerning the urban area or area surrounding this radio transmitter and send it to the terminal device. Nevertheless, the amount of traffic information to be transmitted and displayed in the terminal device is very large.

SUMMARY OF THE INVENTION

DE-A-44 45 582 discloses a method for transmitting traffic information from a central station to a terminal device via an RDS-radio channel, wherein traffic information received in the terminal device is filtered therein with respect to its relevance for an area surrounding the current location of the terminal device.

It is the object of the invention to optimize the traffic information provided to the user of the traffic information through the user's terminal device with the maximum relevant traffic information and the minimum irrelevant traffic information. Pursuant to this object, and others which will become apparent hereafter, one aspect of the present invention resides in a method for transmitting traffic information from a traffic information center to at least one terminal device in a vehicle via a communications channel. The method includes the steps of defining a first reference zone at or around a known or at a presumed stopping place of the vehicle to which information is to be conveyed at a first time point, defining at least a second reference zone at or around at least one presumed stopping place of the vehicle at a second time point lying in the future in relation to the first time point, compiling traffic information, generated for a reference zone and for a respective and additional future time point, with forecasting and traffic information determined for a current time point and for a respective current reference zone for reducing the information to be transmitted in the traffic center, and transmitting data representing the traffic information with the time point to which it relates and/or the reference zone to which it relates. The compiling, according to the invention, of traffic information with respect to its relevance for at least two time points optimizes redundancy. Accordingly, only traffic information that may be relevant for the current stopping place and, as the case may be, for a predefinable reference zone surrounding the current stopping place of a vehicle is compiled for the first of the at least two time points, while the other traffic information is sorted out as irrelevant for the current time point and is not compiled. In a corresponding manner, traffic information is compiled as relevant for the second time point (or third time point, etc.) occurring later in relation to the first time point based on an anticipated stopping place of the terminal device at this second time point in a respective second reference zone, wherein this traffic information is relevant for the second time point for the terminal device based on its stopping area (=reference zone) to be anticipated at this time, while traffic information which is not relevant at the second time point for the terminal device based on its stopping place (or reference zone) anticipated at that time is not included in the compilation, that is, it is sorted out as irrelevant.

In this way, the extent of the traffic information which is transmitted, or which is to be transmitted, is reduced. When the traffic information which is relevant for the first, second and further possible time points based on the respective associated reference zone (=stopping place zone) is compiled in the traffic information center, the amount of traffic information to be transmitted is reduced, so that transmission is more economical. On the other hand, when the compiling of traffic information relevant for a reference zone or for a plurality of reference zones is carried out in the terminal device, the amount of traffic information to be displayed to the user of the terminal device is reduced, resulting in an ergonomic advantage; beyond this, the generation of navigation information based on a reduced database is simplified.

The invention can be arranged in different ways. When the first time point is a future time point, only predicted traffic information is transmitted, whereas if the first time point is the current time point, current and predicted traffic information are transmitted.

Instead of traffic information relating to only two time points and/or reference zones, traffic information relating to three or more time points and/or reference zones can also be transmitted in order to further optimize redundancy.

Transmission can be carried out in particular as mobile radio short messages to a terminal device or to a plurality of terminal devices.

The reference zones can be determined in different ways. A current reference zone can be determined in particular on the basis of the current position of the terminal device which can be detected by the terminal device by means of a location detection device (especially GPS) which is integrated in the terminal device or can be connected to it. Future reference zones can be determined with the terminal device based on a forecast of possible or probable stopping places of a vehicle with the terminal device. For this purpose, a defined speed or speed range of a vehicle can be assumed, or a plurality of speeds or speed ranges with different probabilities can be assumed. When no preferred direction of the vehicle is known and the vehicle can accordingly move in approximately any direction, the reference zones can be arranged in a circle or ring around the current location. Possibly, the expected driving direction and/or the actual driving direction of the vehicle can be taken into account, resulting in reference zones in the form of circular segments or curved ring portions. The first, second and further reference zones can partially overlap (especially in the case of reference zones in the shape of full circles or circular segments) or can be disjunct (for example, when the reference zones are in the shape of rings or curved ring segments).

The definition of reference zones can be predetermined. A determined average speed of a vehicle, possibly differentiated according to types of road, can be assumed and an expected reference zone for predeterminable time intervals can be calculated from this for a determined future time span. In particular, there can be two intervals 10 to 60 minutes apart, especially 30 minutes apart, wherein one time interval can define an inner limit and/or an outer limit of a reference zone.

With respect to the transmission of traffic information from a traffic information center to at least one terminal device when a cellular radio network is used, traffic information can be transmitted in an individualized manner, particularly according to reference zones defined by one or more radio cells. The vehicles of a defined radio cell or a defined group of radio cells within this radio cell receive the same compiled traffic information; this is advisable because it can be assumed in a simplifying manner for all vehicles in a radio cell or group of radio cells that they will have reference zones coinciding in the future for future time points.

The method can be realized in a terminal device especially as a program. A terminal device of this kind advisably has a receiving device in the form of a mobile telephone. When the user actively calls up the information from the traffic information center, the position of the user is needed in order to compile the information. This position can be detected, for example, by a location-finding device or an input device in the terminal device and can be transmitted to the traffic information center. Further, it is possible, for example, to determine the location of the mobile telephone, and therefore the location of the terminal device, based on the information available in a mobile radio network concerning the radio cell/base station with which the mobile radio network currently communicates.

Further, the terminal device can have, in particular, a navigation program for navigating while taking into account transmitted traffic information, wherein the transmission of compiled and selected traffic information simplifies navigation. The navigation program can comprise, in particular, its own route planning program which, depending on the current location and on a destination to be ascertained, can develop and, if required, continuously adapt a route while taking into account the transmitted traffic information. It is further advantageous when a map file of the traffic network is available in the terminal device, especially a map file which can be read in via a CD-ROM drive. The readout in the terminal device for the user can be carried out acoustically and/or optically, for which purpose a readout device can be integrated in the terminal device and/or a connection for a readout device can be provided in the terminal device.

A traffic center, according to the invention, for carrying out the method can have, in particular, a program for carrying out the method. A transmission device can advantageously be a mobile radio device or a connection to a mobile radio device. A DAB or RDS-TMC transmitting device or access to a transmitting device of this type is also suitable.

Further features and advantages are given in the subclaims and the following description of an embodiment example with reference to the drawing.

DETAILED DESCRIPTION OF THE PREFERRED EMBODIMENTS

Figure 1:
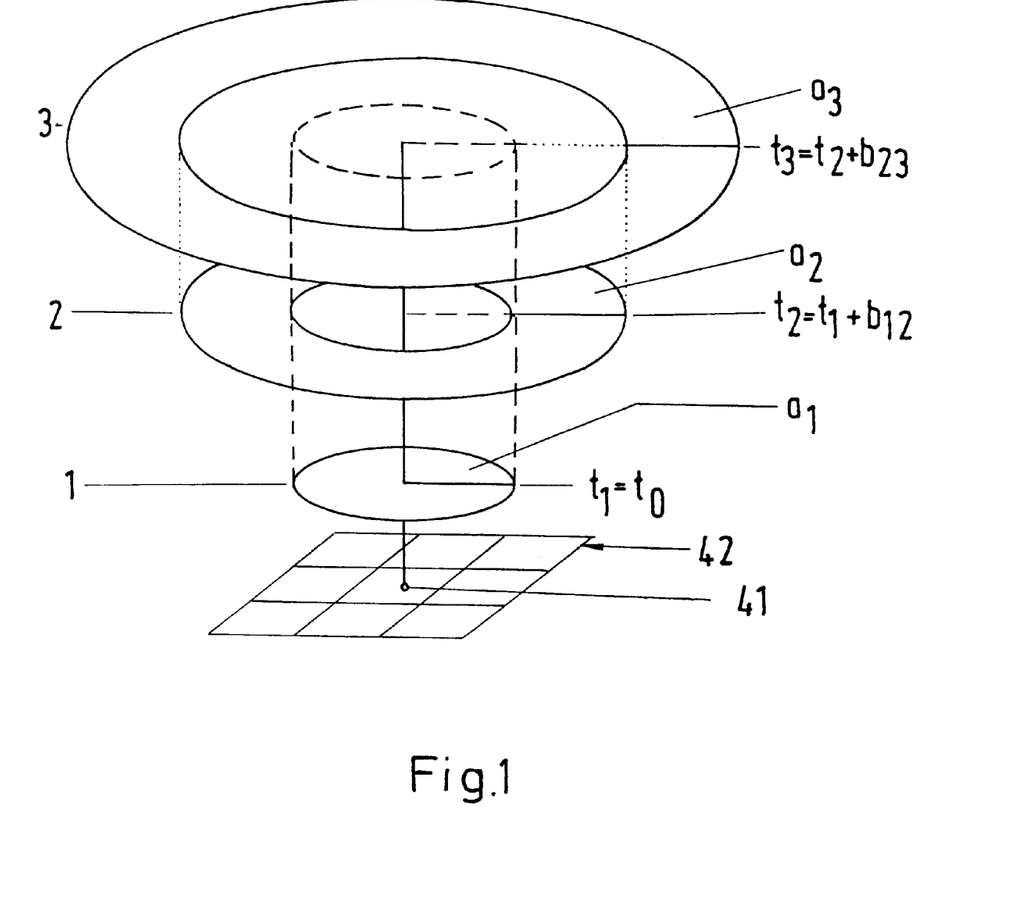
FIG. 1 shows disjunct reference zones surrounding the current stopping place of a vehicle.

FIG. 1 illustrates the fixing of reference zones around the current known stopping place of a vehicle with a terminal device according to the invention. A vehicle 41 with a terminal device according to the invention is located at a known stopping place, in a traffic network indicated by a section from a map 42. The stopping place of the terminal device can be determined, for example, by GPS. Only information that is relevant for the user of the terminal device, for example, a driver of an automobile, should be transmitted and/or displayed to this user. Traffic information concerning a reference zone which the vehicle 41 does not reach in the foreseeable future based on its assumed average speed $v_m$ is of little or no relevance for the user of the terminal device. However, traffic information concerning the immediate surroundings of the current stopping place of the vehicle is relevant for the user of the terminal device. Further, traffic information concerning traffic forecasts for reference zones in which the automobile with the terminal device of the user stops at a time point or within a time span to which the traffic forecast concerning the reference zone in question relates is relevant for the user of the terminal device.

Based on the assumed average speed or speed range $v_m$ of the vehicle 41 (possibly differentiated according to different road types), the location at which the vehicle could stop at a determined time point or within a determined time span can be determined in a simplifying manner, so that traffic information for this reference zone representing the anticipated stopping place can be compiled as traffic information which is selected as relevant for the user of the terminal device in the vehicle and/or can be transmitted from a traffic center to the vehicle and/or can be displayed in the terminal device in the vehicle.

Since the vehicle 41 moves forward at a speed $v_m$, it can move forward by a distance $a_1 = v_m \times b_{12}$ within a time period $b_{12}$, which in this simple case defines a boundary of a reference zone. Accordingly, in FIG. 1 (or in the top view in FIG. 3), the vehicle 41 moves from stopping zone 1 (its center point, in this case) within time span $b_{12}$ to the inner edge of the ring-shaped reference zone 2. In a corresponding manner, the vehicle moves within time span $b_{23}$ from the inner edge of reference zone 2 to the outer edge of reference zone 3. Therefore, the vehicle is located only just within reference zone 1 (in this case, at the outer edge of reference zone 1) at a first, future time point $t_1$, within reference zone 2 (at its outer edge) at time point $t_2$, and within reference zone 3 at time point $t_3$.

Figure 3:
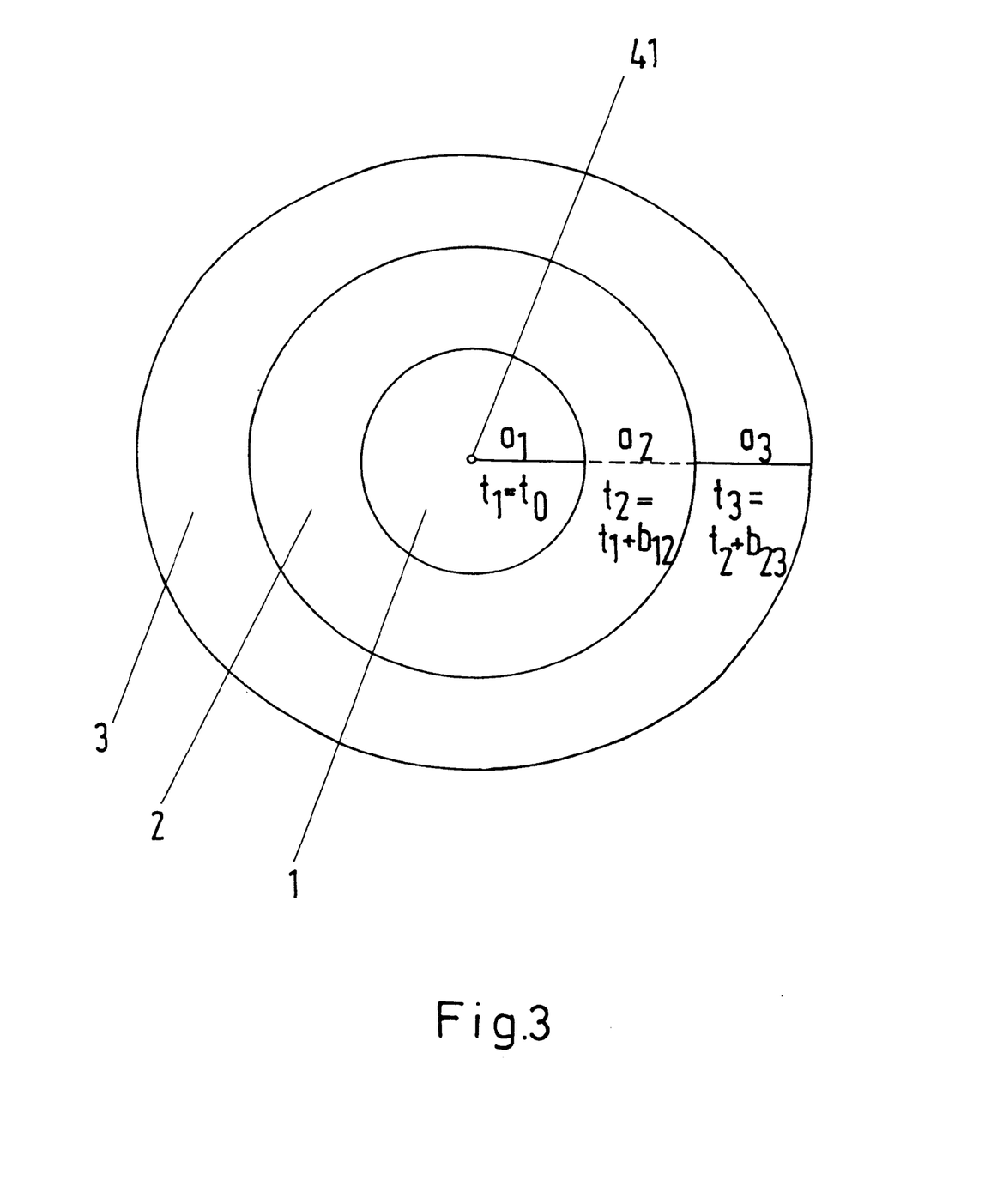
FIG. 3 shows a top view of the reference zones in FIG. 1.

In the simplified case shown herein, the reference zones are adjacent, not overlapping (i.e., disjunct) circular rings with the exception of the inner reference zone which is a circle. However, reference zones can also have any other desired shape.

In the present case, the model can be described as an onionskin model.

Each reference zone 1, 2, 3 corresponds to a time span within which it is to be expected that the vehicle traveling at a defined speed will be located within a respective reference zone. The length of the time span (=time slices) of the reference zones may be predetermined and, in particular, can be 15 to 30 minutes, preferably 30 minutes. For this purpose, the average assumed speed of a vehicle can either be predetermined in a fixed manner or can be predetermined differently depending on the type of road to be traveled. In particular, the average speed can be a value from 50 to 100 km, so that a ring thickness of 25 km (at 50 km/h) or 50 km (at 100 km/h) results in the case of a time slice of 30 minutes as radius. With respect to a different selection of speed depending on the type of road, for example, 30 km per hour can be calculated within towns or cities, 50 km/h can be calculated for rural roads and 100 km/h can be calculated for highways, these speeds referring especially to linear distances, i.e., points on a map.

Figure 2:
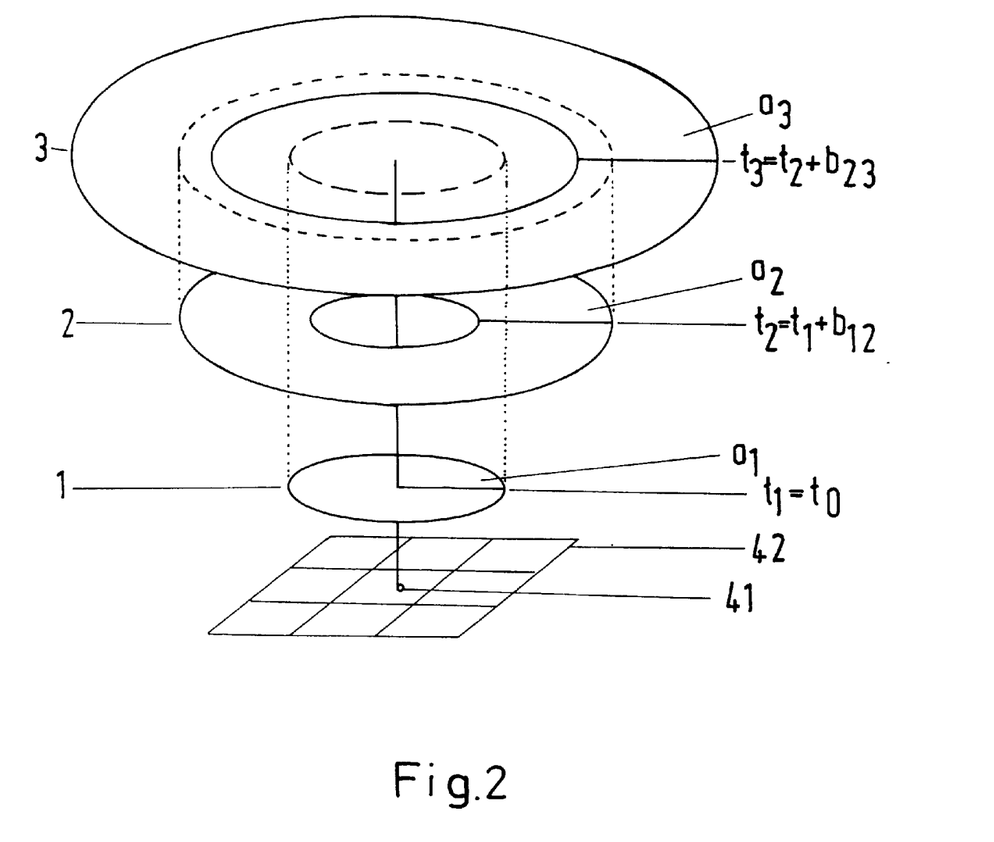
FIG. 2 shows partially overlapping reference zones.

Because of inaccuracies, especially in the case of selected average speeds, it may also be advisable, as is shown in FIG. 2, to overlap the individual reference zones. In the overlapping area of overlapping reference zones, the terminal device can receive traffic information for all reference zones comprehending the current and/or future terminal device location. In FIG. 2, the inner edge of reference zone 2 lies within the outer edge of reference zone 1, while the outer edge of reference zone 2 lies within reference zone 3.

When the destination of a trip is known at least approximately, as is the case particularly in navigation systems with destination interrogation, the amount of relevant traffic information can be limited still further.

Figure 4:
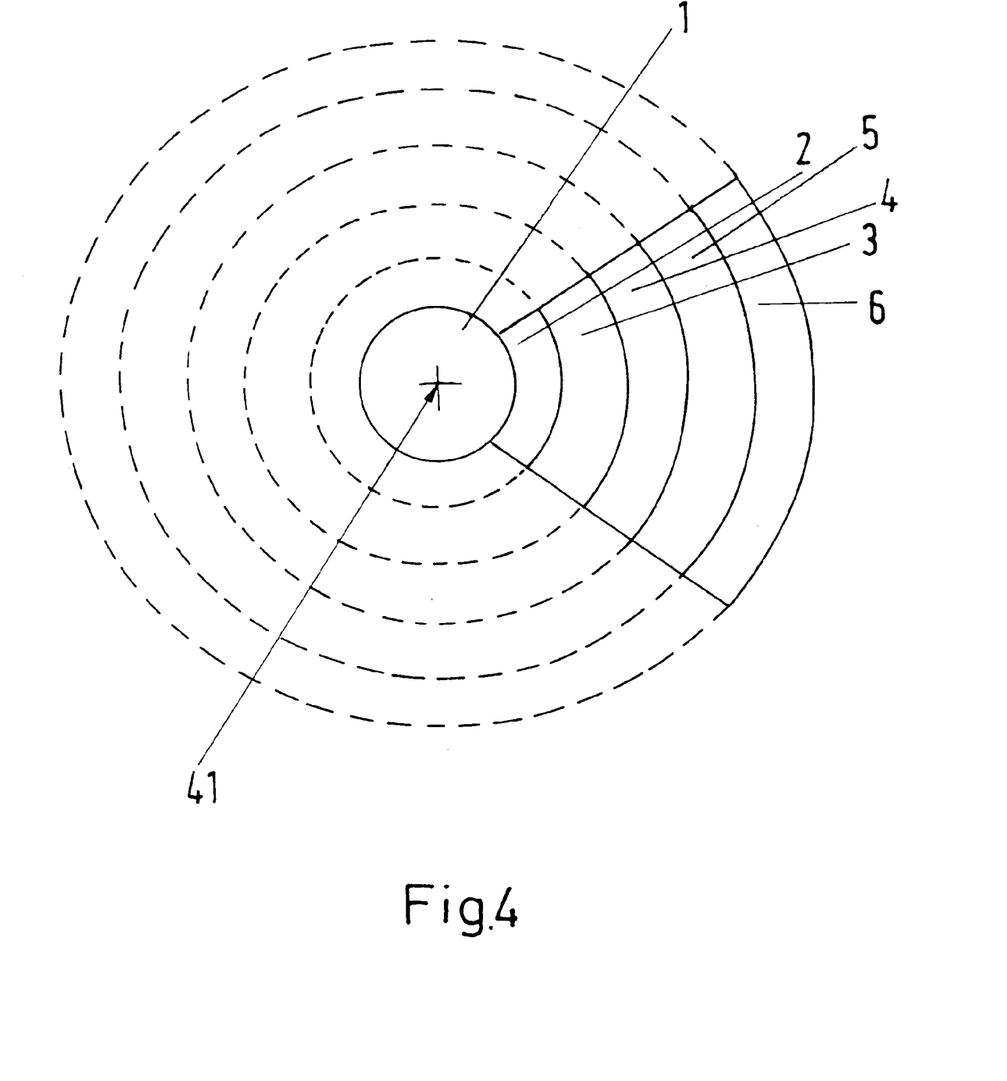
FIG. 4 shows reference zones in the form of curved ring portions of concentric rings.
Figure 5:
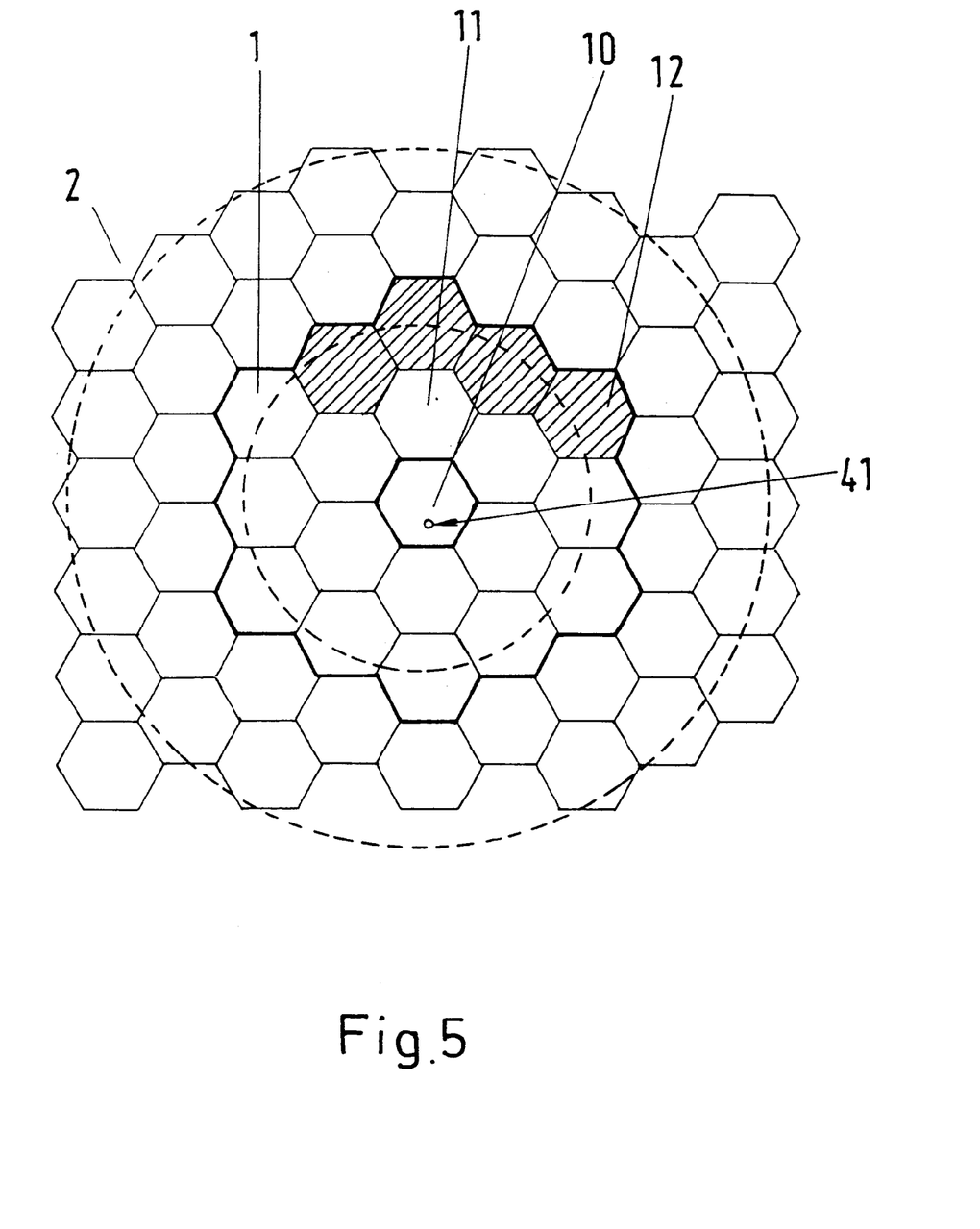
FIG. 5 shows concentric reference zones around the current stopping place of a vehicle which are associated with a honeycomb-shaped, simplified cellular mobile radio network.

In accordance with FIG. 4, reference zones can be limited to circular segments or ring segments when a destination or target direction of a planned route of the terminal device in the traffic network is known only approximately. In FIG. 4, the reference zones (each of which indicates, for a determined time span in the future, an assumed stopping area of a vehicle having a terminal device) are accordingly ring segments 2–6 with the exception of reference zone 1 which is circular. In addition to ring segments, circular segments are also possible. The reference zones can also overlap in case of a destination or driving direction that is known approximately. FIG. 5 shows a cellular radio network, shown here in simplified form as a honeycomb. A vehicle 41 is currently located within cell 10 of the radio network. The reference zone 1 for the vehicle in cell 10 is indicated by the circle 1 in dashed lines and reference zone 2 is indicated by circle 2 in dashed lines. In wide-meshed mobile radio networks, a reference zone 1 may also contain only one radio cell. In the present case, reference zone 1 also contains other radio cells such as radio cells 11 and 12. In the present example, some radio cells such as radio cell 12 lies in both reference zones 1 and 2. Accordingly, it is possible, for example, to assign the cells within the bold line, which includes 12, to only one reference zone (i.e., only reference zone 1 or only reference zone 2) or to both reference zones.

In the present case, for example, identical traffic information is compiled for all of the vehicles within radio cell 10; this traffic information can be transmitted, particularly as a cell broadcast message, from a traffic center to the terminal devices within radio cell 10. For this purpose, current traffic information from zone 1 and relevant forecast traffic information for a future time span are compiled for reference zone 2 which, in the present case, surrounds reference zone 1 in a ring-shaped manner.

Figure 6:
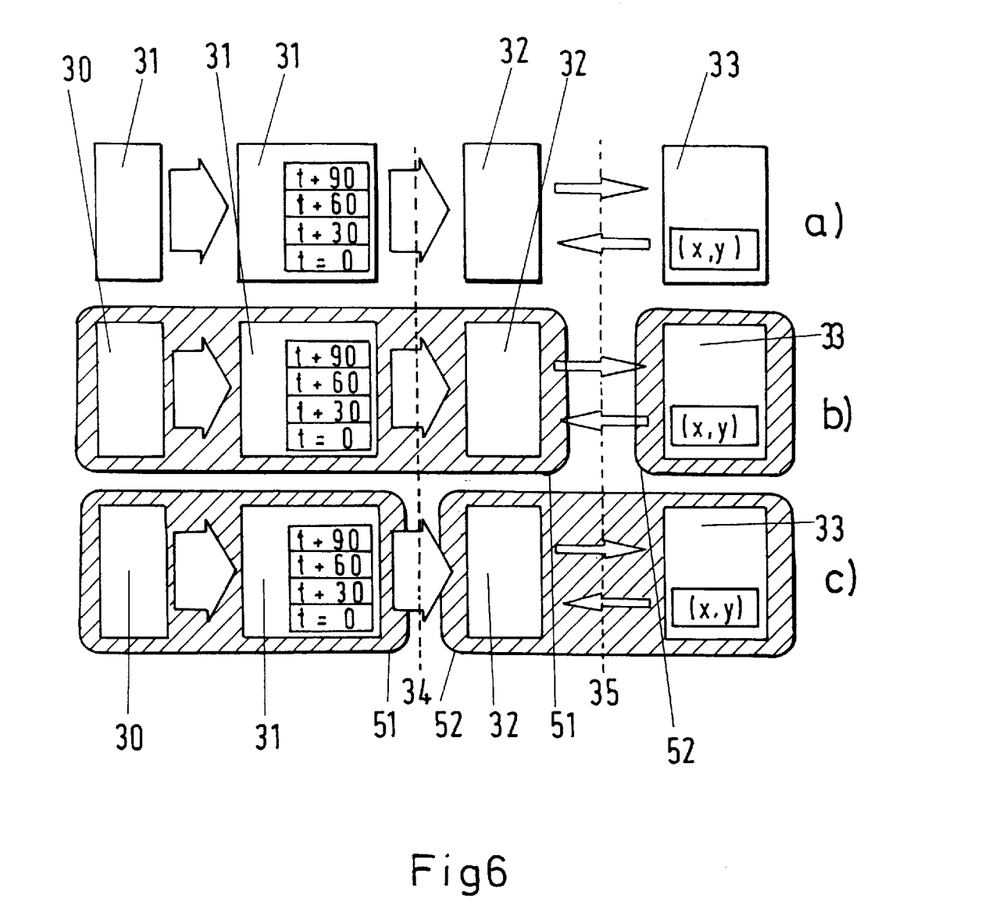
FIG. 6 shows the data flow for traffic information compiled at determined time intervals and reference zones defined thereby.

FIG. 6 shows the flow of compiled traffic information. In FIG. 6a, current traffic information is collected by a traffic center from measurement data from stationary detectors and/or mobile detectors and/or from other sources in step 30. In step 31, current traffic data on the current traffic situation and forecast traffic data on a traffic situation at a future time point are determined by means of models and/or empirical databases and/or further assumptions in a processing unit 31. In so doing, a very large volume of traffic information data occurs. Relevant information should now be filtered out and transmitted and/or displayed to the user. Therefore, in step 32, traffic information which is relevant for a user based on the user's current reference zone (=user's current stopping place and defined surrounding area) and based on reference zones forecast for the future (=forecast stopping areas for future time points or time spans) is compiled, transmitted and displayed in a display 33 to the user in the terminal device 52.

For this purpose, the location of the terminal device is significant. The location of the terminal device (of the vehicle in which the terminal device is located) can be known, for example, based on the radio cell in which the vehicle is located. Alternatively or in addition, it can be determined, for example, by GPS or by another location detection system. The location is transmitted to the traffic center either from a base station in the radio cell or, particularly in the case of a GPS location detection system or the like, via mobile radio from the terminal device to the traffic center. Particularly in the latter case, information can also be compiled individually for a vehicle.

According to FIG. 6b, information is compiled in the traffic center 51, so that the "relevance" filter 32 is located in the traffic center. In this case, only relevant information is compiled and transmitted.

However, as is shown in FIG. 6c, the relevance filter 32 can also be located in the terminal device 52. Therefore, the relevant traffic information can be compiled in the terminal device 52. In this case, only relevant traffic information is shown to the user in the terminal device or only relevant traffic information is used for navigation, etc.

Figure 7:
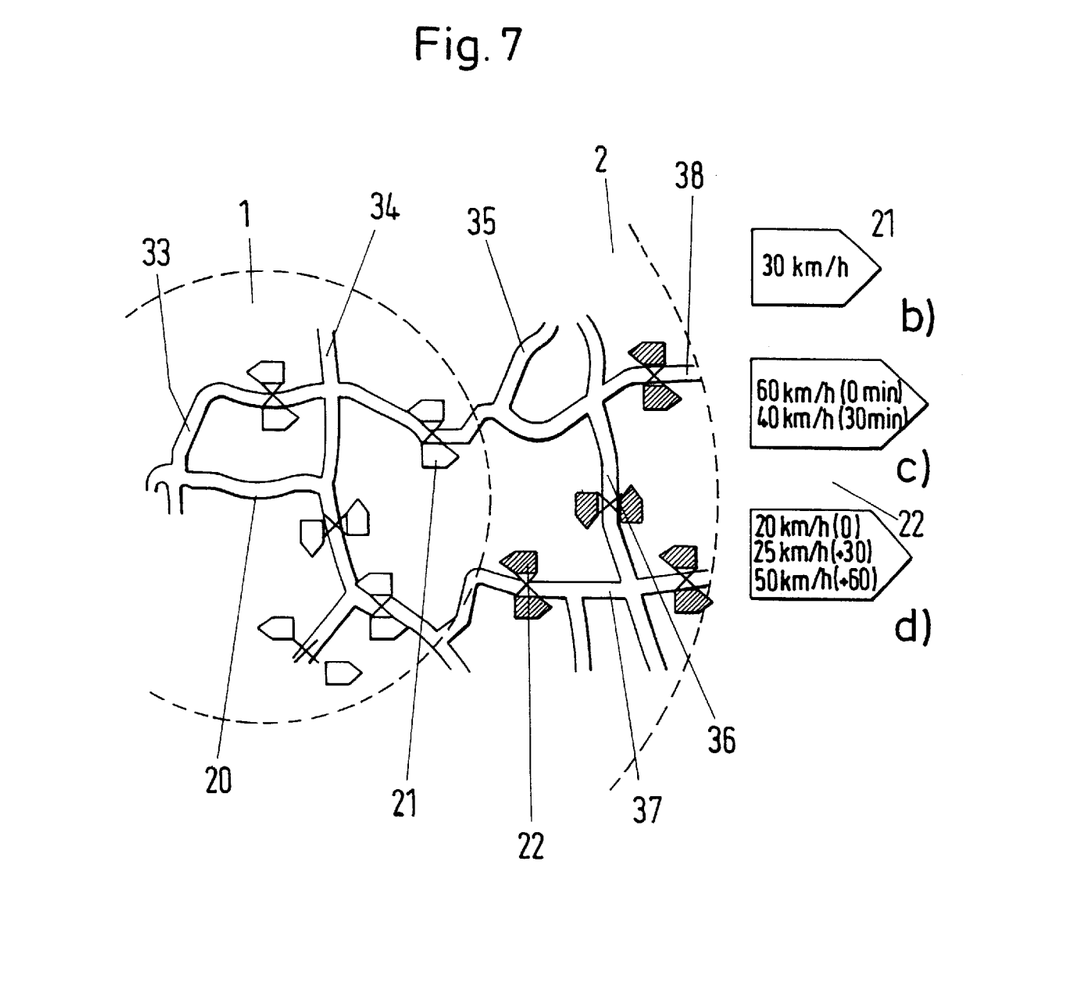
FIG. 7 shows a section of a traffic network around the current location of a terminal device and reference zones surrounding this current location.

FIG. 7 shows a terminal device display with a section of a traffic network with roads 22, 34, 35, 36, 37, 38, 39 and other roads and reference zones 1, 2 within circular dashed lines and existing data records for locations at which data records 21, 22, etc. are shown. With respect to reference zone 1, the data records referring to locations inside of reference zone 1 are transmitted and displayed, while for reference zone 2, data records (such as data record 22) which relate to zones or locations inside of reference zone 2 are transmitted and displayed.

When all of the traffic information is transmitted and the selection according to the invention (that is, the compiling of relevant information) only takes place in the terminal device, an efficient transmission channel is required. Radio networks such as radio with RDS-TMC, pager radio networks and cell broadcast methods for GSM networks, etc. are suitable for this purpose. Because of the high data volume, digital radio transmission (DAB) is particularly suitable. Selection on the terminal device side is especially advisable in navigation devices because navigation devices have arrangements for determining their current position and sometimes have possibilities for processing and displaying and because the received information can be taken into account especially in route calculation or navigation.

Part of the transmission can possibly be carried out via a fixed network. This is possible particularly when transmitting from a traffic center to a vehicle fleet center. In this case, the relevance filter (that is, the compiling of traffic information) can be located in a terminal device in a vehicle of the vehicle fleet operation or in the central office for the vehicle fleet.

Figure 8:
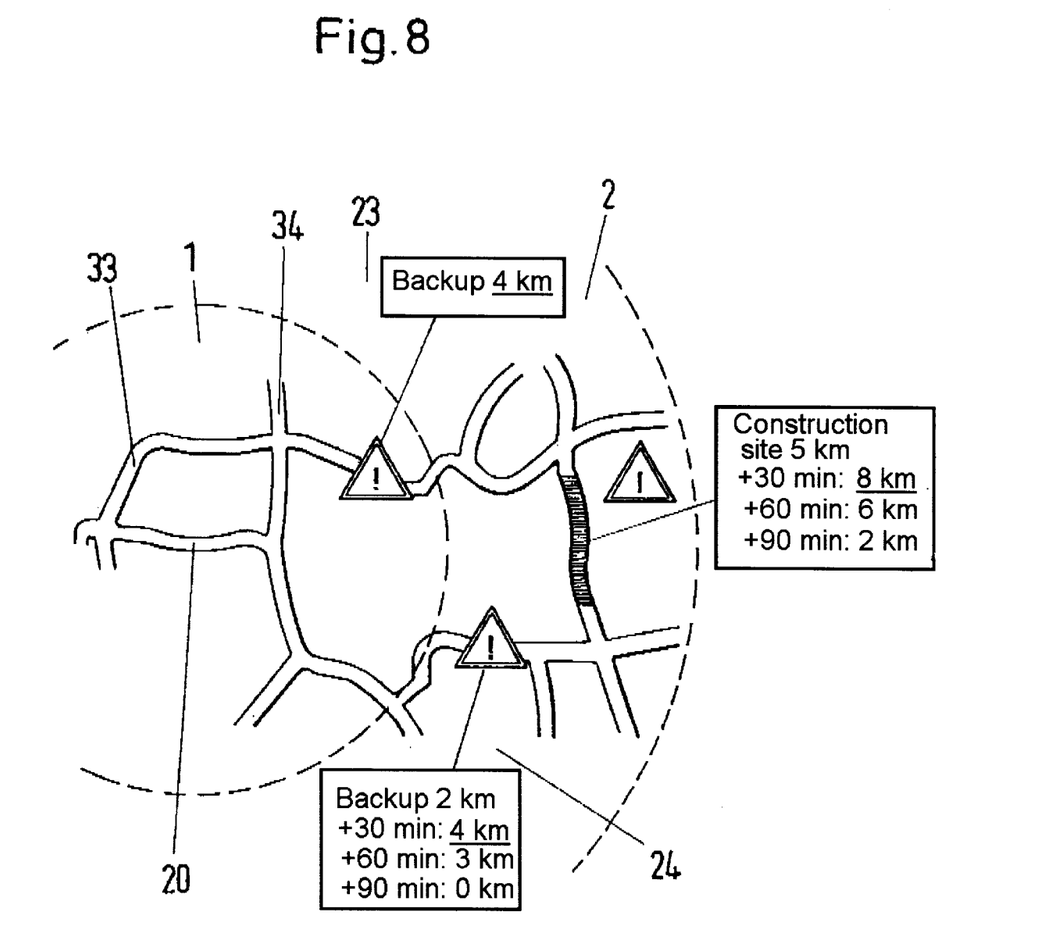
FIG. 8 shows the section of a traffic network according to FIG. 7 with traffic information compiled as relevant for locations in reference zones.

FIG. 8 shows a view of a display of a terminal device which shows a section from a traffic network in the form of roads 20, 39, etc. and messages 23 24 about disturbances. The disturbances are shown on a road by symbols in the form of a triangle containing an exclamation point at the location of the disturbance. The type of disturbance and data concerning it can be requested and indicated on the display, for example, by clicking or selecting with a finger, etc.

Further, it is clear from FIG. 8 that different messages can be displayed for reference zone 1 than for reference zone 2. Accordingly, only traffic information relevant for reference zone 1 is shown therein and only traffic information relevant for reference zone 2 is shown in the latter.

What is claimed is:

1. A method for transmitting traffic information from a traffic information center to at least one terminal device in a vehicle via a communications channel, comprising the steps of:

defining a first reference zone one of at and around one of a known and a presumed location of the vehicle to which information is to be conveyed at a first time point;

defining at least a second reference zone one of at and around at least one presumed location of the vehicle at a second time point lying in the future in relation to the first time point;

compiling traffic information, generated for a reference zone and for a respective second and additional future time point, with forecasting and traffic information determined for a current time point and for a respective current reference zone for reducing information to be transmitted in the traffic center; and transmitting data representing the traffic information with at least one of the time point to which it relates and the reference zone to which it relates.

2. A method according to claim 1, wherein the first time point is also a future time point.

3. A method according to claim 1, wherein the first time point is the current time point, the method including taking current traffic information into account therefor.

4. A method according to claim 1, wherein the transmitting step includes transmitting traffic information concerning at least two reference zones to a terminal device with a receiver in the vehicle.

5. A method according to claim 1, wherein the transmitting step includes transmitting at least one of traffic information concerning more than two time points and traffic information concerning more than two reference zones.

6. A method according to claim 1, including transmitting from the traffic center to the terminal device via mobile radio in the vehicle.

7. A method according to claim 6, including transmitting from the traffic center to the terminal device via mobile radio as at least one of a short message and a cell broadcast message.

8. A method according to claim 1, wherein the first time point is so close to a time point of the transmitting of the traffic information that the traffic information for the first reference zone approximately represents the current traffic information.

9. A method according to claim 1, including predetermining the first time point one of absolutely and relative to the current time point, the traffic information for the first reference zone describing a traffic situation forecast for the first time point.

10. A method according to claim 1, including generating a forecast for the second reference zone that relates to at least one time point in or after a time period within which a vehicle traveling at average speed during a trip from the first reference zone to the second reference zone would reach this second reference zone.

11. A method according to claim 10, including determining average speed of the vehicle by taking into account only a selection from a total number of road types existing in a road network.

12. A method according to claim 1, wherein the second reference zone encloses the first reference zone substantially in a form of a concentric circle as seen from above.

13. A method according to claim 1, wherein the second reference zone represents a section or segment of a region essentially one of concentrically surrounding and comprising the first reference zone.

14. A method according to claim 1, including preparing and transmitting traffic information for different reference zones at different spatial distances from the first reference zone, this traffic information comprising at least one forecasting period corresponding to a respective spatial distance.

15. A method according to claim 1, including surrounding the first reference zone with additional reference zones essentially as concentric surface areas.

16. A method according to claim 15, wherein the additional reference zones surround the first reference zone as circular surface areas.

17. A method according to claim 1, including surrounding first reference zone with additional reference zones which represent sections from concentric surface areas.

18. A method according to claim 1, wherein the reference zones partially overlap.

19. A method according to claim 1, wherein the traffic information describes a traffic situation at given time points having intervals of 10 to 60 minutes between them, the transmitted traffic information indicating given time points one of in an absolute time grid, in a time slot pattern and relative to the first time point.

20. A method according to claim 19, wherein the given time points have 30 minute intervals.

21. A method according to claim 1, including transmitting the traffic information to a receiver via a radio network.

22. A method according to claim 21, including transmitting the traffic information concerning the radio network by at least one central office to at least one terminal device so as to be individualized according to reference zones, the current traffic information concerns the current reference zones of the terminal device and forecasts relate to at least one spatially adjacent reference zone.

23. A method according to claim 1, including transmitting the traffic information via a cellular radio network, the traffic information being transmitted in an individualized manner according to reference zones defined by at least one radio cell, wherein traffic information from adjacent radio cells are taken into account in a radio cell as one of current traffic information and as forecasts by a terminal device receiving it corresponding to a distance of the radio cell from the terminal device.

24. A method according to claim 23, including transmitting the traffic information, when requested individually by a terminal device located spatially in a radio cell, one of to the terminal device via the radio cell and to all receivers in the radio cell by broadcast method.

25. A method according to claim 1, including preparing the traffic information in at least a partly identical manner for a plurality of reference zones, the traffic information comprises both current traffic information and forecast traffic information for given future time points, and transmitting the traffic information via a broadcast-capable radio network.

26. A method according to claim 25, including determining the first reference zone automatically by a terminal device based on the current position of the terminal device, evaluating the current traffic information for the first reference zone, and selecting information concerning other reference zones in a receiver from a totality of transmitted information in accordance with its spatial distance from the first reference zone and is evaluating the selected information in the receiver.

27. A method according to claim 25, including manually inputting the first reference zone.

28. A method according to claim 1, wherein the transmitted traffic information also comprises one of measured and calculated average speeds and travel times for stretches of road.

29. A method according to claim 1, including transmitting current and forecast average speeds to receivers in terminal devices in vehicles via at least one of a paging radio network and a short-range communications channel.

30. A method according to claim 29, including transmitting the current and forecast average speeds to the receivers in the vehicles via beacons.

31. A method according to claim 1, including transmitting over a publicly receivable communications channel.

32. A method according to claim 31, including transmitting over one of a DAG and RDS-TMC communications channel.

33. A method according to claim 1, including transmitting over a private communications channel.

34. A traffic center comprising:

a central station having relevance filter means for transmitting traffic information from a traffic information center to at least one terminal device in a vehicle via a communications channel, by defining a first reference zone one of at and around one of a known and a presumed location of the vehicle to which information is to be conveyed at a first time point, defining at least a second reference zone one of at and around at least one presumed location of the vehicle at a second time point lying in the future in relation to the first time point, compiling traffic information, generated for a reference zone and for a respective second and additional future time point, with forecasting and traffic information determined for a current time point and for a respective current reference zone for reducing information to be transmitted in the traffic center, and transmitting data representing the traffic information with at least one of the time point to which it relates and the reference zone to which it relates; and transmitting means for transmitting information compiled in the relevance filter means of the central station from traffic information which is relevant for first, second and additional time points based on a respective reference zone.

35. A traffic center according to claim 34, wherein the transmitting means includes a mobile telephone.

36. A traffic center according to claim 34, wherein the transmitting means includes one of a DAB and an RDS-TMC-transmitting device.

* * * * *